(12) United States Patent
Usseglio et al.

(10) Patent No.: US 11,674,400 B2
(45) Date of Patent: Jun. 13, 2023

(54) GAS TURBINE ENGINE NOZZLES

(71) Applicants: GE Avio S.r.l., Rivalta di Turin (IT); Avio Polska Sp. z o.o., Biata-Bielsko (PL)

(72) Inventors: Matteo Renato Usseglio, Turin (IT); Enrico Ganzitti, Avigliana (IT); Gianfranco Brandino, Chieri (IT); Rafal Robak, Pszczyna (PL); Tomasz Mucha, Meszna (PL)

(73) Assignees: GE AVIO S.R.L., Rivalta di Torino (IT); AVIO POLSKA SP. Z O.O, Biata-Bielsko (PL)

( * ) Notice: Subject to any disclaimer, the term of this patent is extended or adjusted under 35 U.S.C. 154(b) by 0 days.

(21) Appl. No.: 17/393,743

(22) Filed: Aug. 4, 2021

(65) Prior Publication Data
US 2022/0290571 A1  Sep. 15, 2022

(30) Foreign Application Priority Data
Mar. 12, 2021  (PL) .......................................... 437289

(51) Int. Cl.
| | |
|---|---|
| *F01D 9/04* | (2006.01) |
| *F01D 9/02* | (2006.01) |
| F01D 25/24 | (2006.01) |
| F01D 11/00 | (2006.01) |

(52) U.S. Cl.
CPC ................ *F01D 9/02* (2013.01); *F01D 9/041* (2013.01); *F01D 11/005* (2013.01); *F01D 25/243* (2013.01); *F01D 25/246* (2013.01); *F05D 2220/32* (2013.01); *F05D 2240/128* (2013.01)

(58) Field of Classification Search
CPC . F01D 9/041; F01D 9/042; F01D 9/04; F01D 9/02; F01D 11/005; F01D 11/001; F01D 25/246; F01D 25/243
See application file for complete search history.

(56) References Cited

U.S. PATENT DOCUMENTS

| | | | | |
|---|---|---|---|---|
| 3,423,071 A | * | 1/1969 | Noren ..................... | F01D 9/042 415/209.2 |
| 3,529,904 A | * | 9/1970 | Borden .................. | F01D 11/025 415/110 |
| 3,829,233 A | * | 8/1974 | Scalzo .................. | F01D 11/005 415/110 |
| 4,314,793 A | * | 2/1982 | DeTolla ................ | F01D 11/005 415/137 |
| 4,552,509 A | * | 11/1985 | Schweikl .............. | F01D 11/005 415/135 |
| 4,566,851 A | * | 1/1986 | Comeau ................. | F01D 9/042 415/138 |
| 4,883,405 A | * | 11/1989 | Walker .................... | F01D 9/023 415/137 |

(Continued)

*Primary Examiner* — J. Todd Newton
*Assistant Examiner* — Behnoush Haghighian
(74) *Attorney, Agent, or Firm* — Dority & Manning, P.A.

(57) ABSTRACT

A gas turbine engine including a frame assembly; a turbine assembly; and a nozzle disposed in the turbine assembly, wherein the nozzle defines an inner end along a radial direction and an outer end along the radial direction, wherein the outer end of the nozzle is supported by the frame assembly, wherein the inner end of the nozzle is supported by the frame assembly, and wherein the inner end of the nozzle is displaceable relative to the frame assembly in at least the radial direction.

17 Claims, 4 Drawing Sheets

(56) References Cited

U.S. PATENT DOCUMENTS

| | | | | |
|---|---|---|---|---|
| 5,201,846 A * | 4/1993 | Sweeney | F01D 9/04 | 415/177 |
| 5,211,536 A * | 5/1993 | Ackerman | F01D 9/042 | 415/177 |
| 5,249,920 A * | 10/1993 | Shepherd | F01D 11/005 | 415/134 |
| 5,271,714 A * | 12/1993 | Shepherd | F01D 25/246 | 415/189 |
| 5,289,677 A * | 3/1994 | Jarrell | F23R 3/60 | 60/800 |
| 5,343,694 A * | 9/1994 | Toborg | F01D 9/042 | 415/209.2 |
| 6,658,853 B2 * | 12/2003 | Matsuda | F01D 9/023 | 60/753 |
| 7,037,071 B2 * | 5/2006 | Antunes | F01D 9/023 | 415/209.2 |
| 7,094,025 B2 * | 8/2006 | Arness | F01D 9/042 | 415/209.2 |
| 7,094,026 B2 * | 8/2006 | Coign | F01D 9/023 | 415/209.2 |
| 7,264,442 B2 * | 9/2007 | Harding | F16J 15/0887 | 415/173.7 |
| 7,527,469 B2 * | 5/2009 | Zborovsky | F01D 9/041 | 415/110 |
| 7,850,425 B2 * | 12/2010 | Snook | F01D 9/041 | 415/213.1 |
| 7,900,461 B2 * | 3/2011 | Varney | F02C 7/28 | 60/800 |
| 8,001,792 B1 | 8/2011 | Dvorak et al. | | |
| 8,092,163 B2 * | 1/2012 | Shapiro | F01D 9/042 | 415/209.2 |
| 8,172,522 B2 * | 5/2012 | Shapiro | F04D 29/526 | 415/209.2 |
| 8,182,202 B2 * | 5/2012 | Bart | F01D 9/042 | 415/174.4 |
| 8,206,096 B2 * | 6/2012 | Prentice | F01D 9/042 | 415/200 |
| 8,328,511 B2 * | 12/2012 | Hernandez Russe | F01D 25/246 | 415/209.2 |
| 8,403,634 B2 * | 3/2013 | Arness | F01D 11/005 | 415/189 |
| 8,453,464 B2 * | 6/2013 | Durocher | F02C 7/28 | 415/137 |
| 8,636,465 B2 * | 1/2014 | Durocher | F01D 25/243 | 415/214.1 |
| 9,366,444 B2 * | 6/2016 | Salunkhe | F23R 3/42 | |
| 9,394,915 B2 * | 7/2016 | Gordon | F02C 7/28 | |
| 9,683,459 B2 * | 6/2017 | Aoki | F01D 9/04 | |
| 9,752,506 B2 * | 9/2017 | Schwartz | F01D 25/08 | |
| 9,784,113 B2 * | 10/2017 | Fremont | C04B 37/006 | |
| 9,822,655 B2 * | 11/2017 | Beaujard | F01D 5/284 | |
| 9,850,771 B2 * | 12/2017 | Porter | F02C 3/04 | |
| 9,869,200 B2 * | 1/2018 | Jones | F01D 11/001 | |
| 9,938,858 B2 * | 4/2018 | Klingels | F01D 25/162 | |
| 10,180,073 B2 | 1/2019 | Tuertscher et al. | | |
| 10,301,957 B2 * | 5/2019 | Lemoine | F01D 25/243 | |
| 10,436,051 B2 * | 10/2019 | Wilson | F01D 11/02 | |
| 10,597,334 B2 * | 3/2020 | Watanabe | F01D 11/001 | |
| 11,287,045 B2 * | 3/2022 | McCaffrey | F16J 15/445 | |
| 2009/0038311 A1 * | 2/2009 | Snook | F01D 9/042 | 239/392 |
| 2010/0319352 A1 * | 12/2010 | Hernandez Russe | F01D 9/041 | 415/209.3 |
| 2011/0081234 A1 * | 4/2011 | Durocher | F01D 25/26 | 415/134 |
| 2013/0323045 A1 * | 12/2013 | Porter | F01D 11/08 | 277/650 |
| 2014/0227088 A1 * | 8/2014 | Beaujard | F01D 11/001 | 415/196 |
| 2014/0314556 A1 * | 10/2014 | Fremont | B29D 99/0025 | 29/889.22 |
| 2015/0226075 A1 * | 8/2015 | Aoki | F01D 25/246 | 415/209.3 |
| 2015/0361893 A1 * | 12/2015 | Klingels | F01D 25/162 | 415/213.1 |
| 2016/0177765 A1 * | 6/2016 | Lemoine | F01D 11/005 | 415/214.1 |
| 2018/0037511 A1 * | 2/2018 | Watanabe | F01D 9/041 | |
| 2018/0238184 A1 | 8/2018 | Reynolds et al. | | |
| 2018/0298767 A1 | 10/2018 | Correia | | |

* cited by examiner

GAS TURBINE ENGINE NOZZLES

CROSS-REFERENCE TO RELATED APPLICATIONS

The present application claims priority to Polish Patent Application No. P.437289, filed Mar. 12, 2021.

FIELD

The present subject matter relates generally to gas turbine engines, and more particularly to improved nozzles in gas turbine engines.

BACKGROUND

Gas turbine engines generally include compressors and turbines disposed on opposite sides of a combustion zone. Force from the combustion causes the turbines to rotate which in turn rotatably biases the compressors to force air into the combustion zone. It is known to use multi-stage engines including, for example, high speed turbines and compressors and low speed turbines and compressors. In order, the flow path of air moving through the gas turbine passes from the low speed compressor to the high speed compressor followed by the combustion zone. Exhaust from the combustion then passes through the high speed turbine to the low speed turbine and out a rear nozzle to propel the engine and associated aircraft.

As air passes through these components it may incur rotational energy, causing the air to swirl. Stators, referred to herein as nozzles, may be positioned at key points along the flowpath in order to remove rotational energy from the flow stream and straighten the air. Traditionally, these nozzles are attached to frame assembly components of the gas turbine engine only at their radially outer sides. This is referred to as a cantilevered attachment. This causes significant stress and axial deflection of the nozzles which can lead to premature wear. The industry continues to demand improvements to gas turbine engines which can reduce wear and lengthen operational lifespan of gas turbine engines.

BRIEF DESCRIPTION

Aspects and advantages of the invention will be set forth in part in the following description, or may be obvious from the description, or may be learned through practice of the invention.

In one exemplary embodiment of the present disclosure, a gas turbine engine comprising: a frame assembly; a turbine assembly; and a nozzle disposed in the turbine assembly, wherein the nozzle defines an inner end along a radial direction and an outer end along the radial direction, wherein the outer end of the nozzle is supported by the frame assembly, wherein the inner end of the nozzle is supported by the frame assembly, and wherein the inner end of the nozzle is displaceable relative to the frame assembly in at least the radial direction.

According to another exemplary embodiment of the present disclosure, a nozzle assembly for a gas turbine engine, the nozzle assembly comprising: an annular body defining an inner end in a radial direction and an outer end in the radial direction, wherein the inner end of the annular body is configured to be engaged with an inner portion of a frame assembly of the gas turbine engine, wherein the outer end of the annular body is configured to be engaged with an outer portion of the frame assembly of the gas turbine engine, and wherein the inner end of the annular body is configured to form a dynamic interface with the inner portion of the frame assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
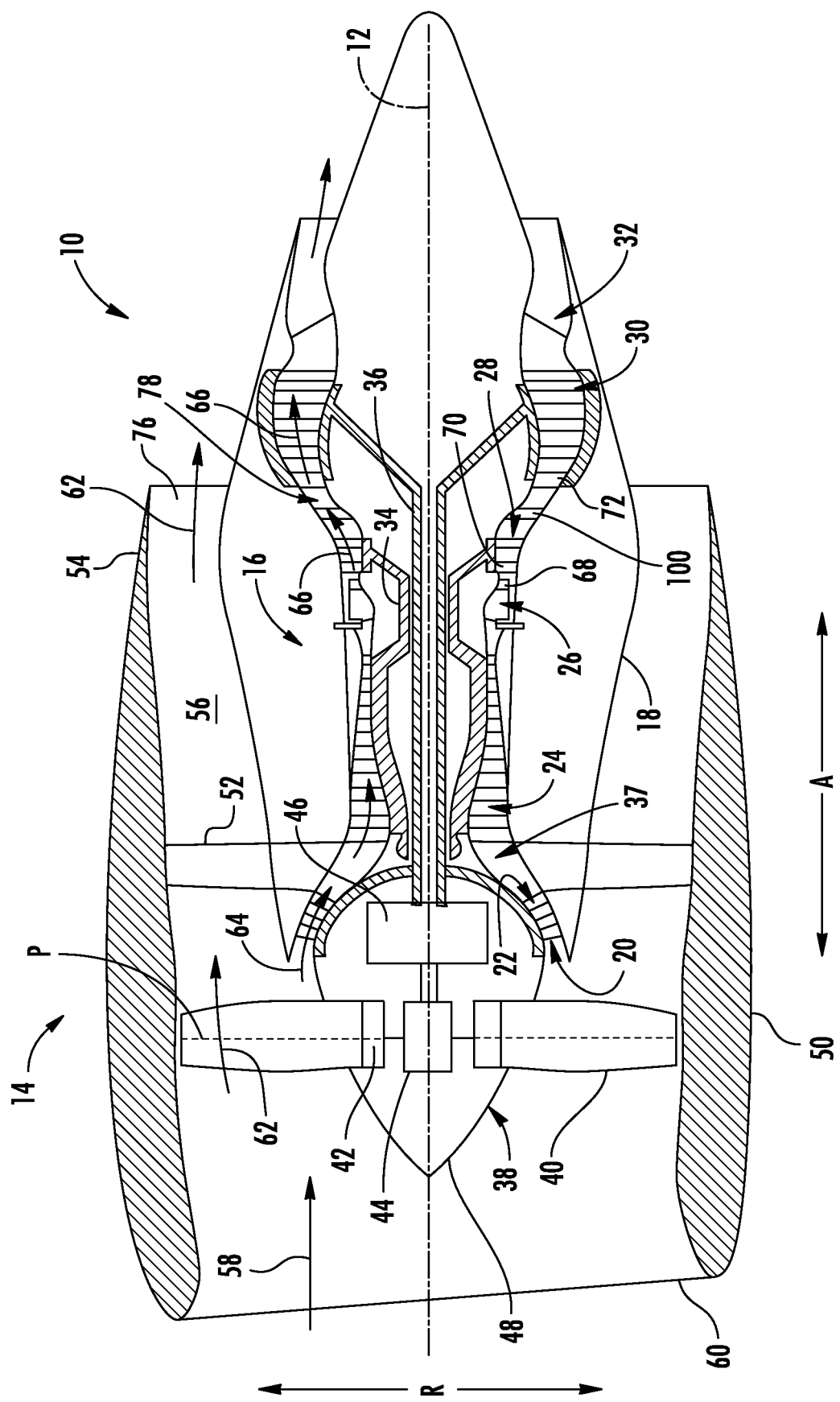
FIG. 1 is a cross-sectional view of an exemplary engine in accordance with an exemplary embodiment of the present disclosure.

Repeat use of reference characters in the present specification and drawings is intended to represent the same or analogous features or elements of the present invention.

DETAILED DESCRIPTION

Reference now will be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The singular forms "a," "an," and "the" include plural references unless the context clearly dictates otherwise. The terms "coupled,"

"fixed," "attached to," and the like refer to both direct coupling, fixing, or attaching, as well as indirect coupling, fixing, or attaching through one or more intermediate components or features, unless otherwise specified herein.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In accordance with one or more embodiments described herein, a gas turbine engine can include a frame assembly and a turbine assembly having a nozzle supported in an axial direction by the frame assembly at both an inner end of the nozzle in a radial direction and at an outer end of the nozzle in a radial direction. The inner end of the nozzle may be coupled with the frame assembly through an axial retention features which transfers axial force from the inner end of the nozzle to the frame assembly. The inner end of the nozzle may be configured to be displaceable in a radial direction relative to the axial retention features. For instance, the axial retention features can include a gap extending in a radial direction in which the inner end of the nozzle is disposed within. The inner end of the nozzle can be displaceable in the radial direction relative to the axial retention features. For example, the nozzle may expand during use, causing the inner end to displace further into the gap of the axial retention feature. In an embodiment, the outer end of the nozzle can be engaged with an outer portion of the frame assembly through a plurality of spaced apart interfaces. The interfaces can be oversized in at least one direction to accommodate relative movement between the outer end of the nozzle and the frame assembly.

Referring now to the figures, FIG. 1 illustrates an exemplary schematic cross-sectional view of a gas turbine engine in accordance with an exemplary embodiment. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, and turbine section together define a core air flowpath 37 extending from the annular inlet 20 through the LP compressor 22, HP compressor 24, combustion section 26, HP turbine section 28, LP turbine section 30 and jet nozzle exhaust section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

Referring still to FIG. 1, it will be appreciated that the turbomachine 16 includes one or more frame assemblies for supporting the turbomachine 16. For example, the turbomachine 16 depicted includes a compressor frame assembly 23 positioned between the LP compressor 22 and HP compressor 24, a turbine center frame assembly 29 located in the turbine section and extending through the core air flowpath 37 at a location between the HP turbine 28 and the LP turbine 30, and a turbine rear frame assembly 31 located in the turbine section and extending through the core air flowpath 37 at a location downstream of the HP turbine 28. For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40, e.g., in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front spinner cone 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. It should be appreciated that for the embodiment depicted, the nacelle 50 is supported relative to the turbomachine 16 by a plurality of circumferentially-spaced outlet guide vanes 52. Moreover, a downstream section 54 of the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to an inner casing (not shown) and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of a plurality of LP turbine rotor blades 72. The plurality of LP turbine rotor blades 72 drive the LP shaft or spool 36, thus causing the LP shaft or spool 36 to rotate. Such thereby supports operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbine fan engine 10 may instead be configured as any other suitable turbomachine including, e.g., any other suitable number of shafts or spools, and excluding, e.g., the power gearbox 46 and/or fan 38, etc. Accordingly, it will be appreciated that in other exemplary embodiments, the turbofan engine 10 may instead be configured as, e.g., a turbojet engine, a turboshaft engine, a turboprop engine, etc., and further may be configured as an aeroderivative gas turbine engine or industrial gas turbine engine.

Referring still to FIG. 1, it will be appreciated that the engine 10 further includes one or more nozzles for straightening airflow within the core air flowpath 37. For the embodiment depicted, the engine 10 includes at least a turbine nozzle 100 positioned within the turbine section of the engine 10, between the high pressure (HP) turbine 28 and the low pressure (LP) turbine 30.

Figure 2:
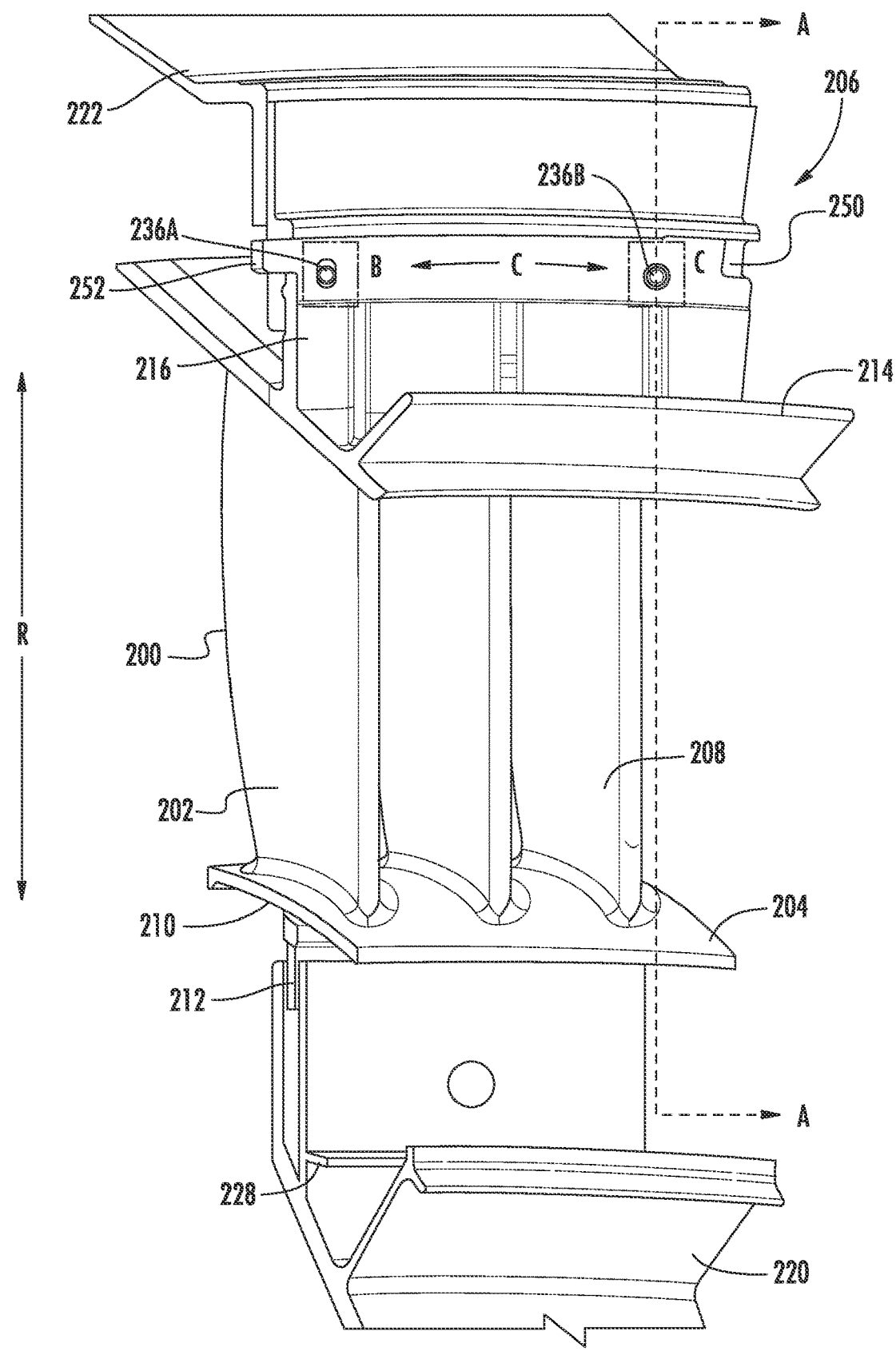
FIG. 2 is a perspective front view of a portion of a nozzle of a gas turbine engine in accordance with an exemplary embodiment of the present disclosure.

Referring now to FIG. 2, a partially cut away view of a portion of the engine 10 is provided. In particular, FIG. 2 shows a nozzle 200 of a gas turbine engine in accordance with an exemplary embodiment. The nozzle 200 can be disposed within the turbine section of the engine 10, such as between the high pressure (HP) turbine 28 and the low pressure (LP) turbine 30. The nozzle 200 may be a turbine nozzle such as the turbine nozzle 100 of FIG. 1. By way of example, the nozzle 200 can be formed at least in part, such as essentially consist of, ceramic matrix composite (CMC), alloys, composites, and the like.

The nozzle 200 can generally include an annular body 202 which forms a ring defining an inner end 204 in a radial direction R and an outer end 206 in the radial direction R. In an embodiment, the annular body 202 can include a plurality of segments which together form the annulus. The inner and outer ends 204 and 206 can be spaced apart by a plurality of stator vanes 208 extending between the inner and outer ends 204 and 206. The stator vanes 208 can generally define a shape configured to affect a flowpath of air passing through the nozzle 200.

The inner end 204 of the nozzle 200 can include a base 210 from which the stator vanes 208 extend radially outward. The base 210 of the nozzle 200 can extend around a circumference of the engine 10. An inner tab 212 can project from the inner end 204, such as from the base 210, in a radially inward direction toward a central axis of the engine 10. In an embodiment, the inner tab 212 can be oriented generally perpendicular to the base 210, or a best fit line thereof, or be perpendicular to the portion of the base 210 from which the inner tab 212 extends from. In another embodiment, the inner tab 212 can be canted forward or backward so as to form an angled interface. By way of non-limiting example, the canted angle can be at least 1°, as measured with respect to the radial direction R, such as at least 2°, such as at least 3°, such as at least 4°, such as at least 5°, such as at least 10°, such as at least 15°, such as at least 20°.

The outer end 206 of the nozzle 200 can include a base 214 from which the stator vanes 208 extend radially inward. The base 214 of the nozzle 200 can extend around a circumference of the engine 10. An outer tab 216 can project from the outer end 206, such as from the base 214, in a radially outward direction away from the central axis of the engine 10. In an embodiment, the outer tab 216 can be oriented generally perpendicular to the base 214, or a best fit line thereof, or be perpendicular to the portion of the base 214 from which the outer tab 216 extends from. In another embodiment, the outer tab 216 can be canted forward or backward so as to form an angled interface. By way of non-limiting example, the canted angle can be at least 1°, as measured with respect to the radial direction R, such as at least 2°, such as at least 3°, such as at least 4°, such as at least 5°, such as at least 10°, such as at least 15°, such as at least 20°. In an embodiment, the inner and outer tabs 212 and 216 can have the same, or relatively same, canted angle, as measured by an angular offset relative to the radial direction of the engine 10.

The nozzle 200 can be coupled to a frame assembly 218 of the engine 10. The frame assembly 218 can include an inner portion 220 and an outer portion 222. The inner end 204 of the nozzle 200 can be coupled with the inner portion 220 of the frame assembly 218 and the outer portion 214 of the nozzle 200 can be coupled with the outer portion 222 of the frame assembly 218. In a more particular embodiment, the inner tab 212 of the nozzle 200 can be coupled with the inner portion 220 of the frame assembly 218 and the outer tab 216 of the nozzle 200 can be coupled with the outer portion 222 of the frame assembly 218.

In an embodiment, force imparted on the stator vanes 208 from operation of the engine 10 can be transferred to both the inner and outer portions 220 and 222 of the frame assembly 218. The relative transfer of force through the inner and outer portions 220 and 222 of the nozzle 200 can vary based on relative geometry of the nozzle 200 and/or frame assembly 218, shape(s) and/or sizes of one or more components of the interfaces between the nozzle 200 and frame assembly 218, material selection, and the like. In an embodiment, at least 10% of the force imparted on the stator vanes 208 during operation of the engine 10 can be transferred to the inner portion 220 of the frame assembly 218, such as at least 20% of the force can be transferred to the inner portion 220 of the frame assembly 218, such as at least 30% of the force can be transferred to the inner portion 220 of the frame assembly 218, such as at least 40% of the force can be transferred to the inner portion 220 of the frame assembly 218. In a particular embodiment, the force on the stator vanes 208 can be generally equally distributed between the inner and outer portions 220 and 222 of the frame assembly 218. That is, force imparted on the stator vanes 208 can be shared equally, or generally equally, between the inner and outer portions 220 and 222 of the frame assembly 218. In such a manner, fatigue and other influencing factors caused, e.g., by single sided mounting of the stator vanes 208, which might prematurely wear the nozzle 200 can be reduced so as to effectively increase operational lifespan thereof.

In an embodiment, the nozzle 200 can include a radial interlock feature, including for example, a first radial interlock feature 250 and a second interlock feature 252. In a particular instance, the first and second radial interlock features 250 and 252 can be spaced apart around the circumference of the nozzle 200. The first radial interlock feature 250 depicted in FIG. 2 is a recess and the second radial interlock feature 252 is depicted as a projection. The first and second radial interlock features 250 and 252 can be configured to react with load on the nozzle 200 and prevent the nozzle from rotating in a circumferential direction. The radial interlock features can be configured to relieve stress at interfaces 236A and 236B (described in greater detail below).

Figure 3:
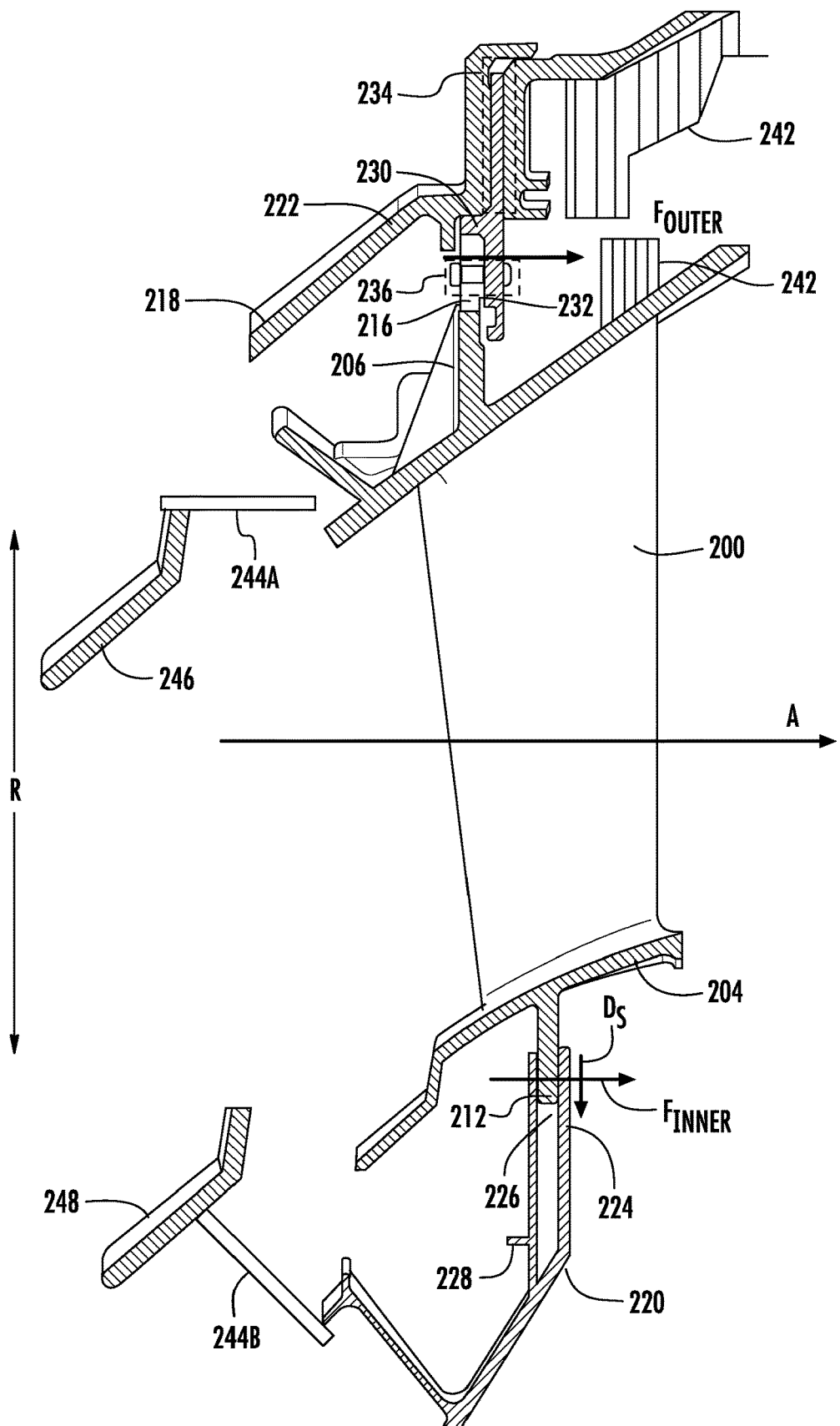
FIG. 3 is a cross-sectional view of the nozzle of FIG. 2 as seen along Line A-A in accordance with an embodiment.

FIG. 3 illustrates a cross-sectional view of the portion of the engine 10 depicted in FIG. 2, as seen along Line A-A. In operation, force is imparted on the stator vanes 208 in the axial direction A. The force may further include other component vectors, such as radial forces (inward and/or outward) and rotational forces (clockwise and/or counterclockwise). Forces imparted on the stator vanes 208, particularly in the axial direction A, can generally be distributed to the inner and outer portions 220 and 222 of the frame assembly 218. This is shown in FIG. 3 by sub-forces $F_{INNER}$ and $F_{OUTER}$. In such a manner, the frame assembly 218 can support the nozzle 200 in the axial direction along both an inner end 204 of the nozzle 200 in a radial direction R and an outer end 206 of the nozzle 200 in a radial direction R.

In an embodiment, the inner end 204 of the nozzle 200 can form a dynamic interface with the inner portion 220 of the frame assembly 218. As used herein, the term "dynamic interface" refers to a relative interface between two or more components whereby at least two of the two or more components have at least one degree of freedom therebetween. In certain instances, the dynamic interface can define at least two degrees of freedom, such as at least three degrees of freedom, such as at least four degrees of freedom. In an embodiment, at least one of the inner end 204 of the nozzle 200 or inner portion 220 of the frame assembly 218 can be displaceable, e.g., translatable, relative to the other of the inner end 204 or inner portion 220. That is, for example, the inner end 204 of the nozzle 200 may be displaceable relative to the inner portion 220 of the frame assembly 218 in the radial direction R. By way of example, the inner tab 212 can translate in the radial direction relative to the inner portion 220 of the frame assembly 218. This may occur, for example, during prolonged usage when the nozzle 200 is exposed to high operational temperatures which can cause the nozzle to deform, e.g., expand. Traditionally, such deformation was not compensated for as traditional nozzles are cantilever mounted and not coupled to the frame assembly at both inner and outer radial ends. In an embodiment, use of the dynamic interface between the inner end 204 of the nozzle 100 and inner portion 220 of the frame assembly 218 can accommodate deformation of the nozzle 100 or frame assembly 218 while allowing the outer end 206 of the nozzle 200 to be statically fixed relative to the outer portion 222 of the frame assembly 218. In certain instances, statically fixing the outer end 206 of the nozzle 200 to the outer portion 222 of the frame assembly 218 while allowing the inner end 204 of the nozzle 200 to move relative to the inner portion 220 of the frame assembly 218 can increase structural integrity of at least the nozzle 200 and prolong operational lifespan of at least the nozzle 200.

As the nozzle displaces radially, the inner tab 212 can slide radially along the inner portion 220 of the frame assembly 218. More particularly, the inner tab 212 can slide along an axial retention feature, such as an upstream surface 224 of the inner portion 220 of the frame assembly 218. The upstream surface 224 can extend in the radial direction R and define an effective depth, $D_S$, as measured from an open end to an effective bottom-out position of the inner tab 212. In an embodiment, the effective depth, $D_S$, of the upstream surface 224 can be configured to accommodate a maximum displacement of the inner tab 212. In such a manner, bottom-out of the inner tab 212 can be mitigated, preventing undesirable force loading on the inner portion 220 of the frame assembly 218.

The upstream surface 224 of the inner portion 220 can be disposed downstream of the inner tab 212 so as to provide axial support in response to force subcomponent $F_{INNER}$ transmitted by the inner tab 212. In an embodiment, the upstream surface 224 can form a surface of a groove 226. That is, for example, the axial retention feature can include the groove 226 for supporting axial loading transferred from the nozzle 200. The groove 226 can be further formed from a secondary component 228 of the frame assembly 218. The secondary component 228 can include, for example, a body (e.g., an annular body) coupled with the inner portion 220. The groove 226 can be formed between at least a portion of the secondary component 228 and the inner portion 220. In certain instances, the axial dimension, i.e., thickness, of the groove 226 can be selected so as to permit radial displacement of the inner tab 212 under radial loading conditions, like expansion of the nozzle 200 under load. In one or more embodiments, an innermost end of the groove 226 can have a tapered profile to mitigate occurrence of bottom-out situations.

In certain instances, the secondary component 228 can be fixedly coupled to the inner portion 220 of the frame assembly 218. That is, the secondary component 228 can be statically mounted relative to the inner portion 220, e.g., by one or more non-dynamic fasteners like threaded fasteners. In other instances, the secondary component 228 can be dynamically coupled to the inner portion 220, or include a dynamic portion, so as to permit flexure and/or compensation of the groove 226, e.g., for bottom-out instances, temperature induced geometry/size changes, and the like.

During operation of the engine 10, the inner tab 212 can slide relative to the upstream surface 224 in a radial direction. In certain instances, the inner tab 212 can further slide relative to the upstream surface 224 in a circumferential direction (e.g., rotation of the nozzle 200). However, circumferential displacement between the inner tab 212 and upstream surface 224 may be less than displacement of the inner tab 212 in a radial direction as caused by deflection of the nozzle 200.

As described above, the outer end 206 of the nozzle 200 can be coupled with the outer portion 222 of the frame assembly 218. More particularly, the outer tab 216 of the outer end 206 of the nozzle 200 can be coupled with the outer portion 222 of the frame assembly 218. As illustrated in FIG. 3, the outer tab 216 can transfer axial load to the outer portion 222 of the frame assembly 218 through a secondary component 230. The secondary component 230 can extend from the outer portion 222 of the frame assembly 218 in a radially inward direction. An upstream surface 232 of the secondary component 230 can interface with the outer tab 216 to provide at least one of axial and radial support to the nozzle 200 in response to force subcomponent $F_{OUTER}$.

In an embodiment, the secondary component 230 can be coupled with the outer portion 222 of the frame assembly 218 through a compression fit at interface 234 whereby, e.g., a portion of the secondary component 230 is compressed (clamped) between two or more sections of the outer portion 222 of the frame assembly 218. The secondary component 230 can alternatively be fastened to the outer portion 222 of the frame assembly 218 using one or more of fasteners, clamps, bayonet connections, interference fits, snap fits, and the like.

The outer tab 216 of the nozzle 200 can be connected to the outer portion 222 of the frame assembly 218, e.g., via the secondary component 230, at one or more interfaces 236. Referring again to FIG. 2, in an embodiment the interfaces 236 can be spaced apart from one another in a generally circumferential direction C around the engine 10. In a particular embodiment, the interfaces 236 can be generally equally spaced apart from one another in the circumferential direction C. In another particular embodiment, the interfaces 236 can be staggered at uneven intervals in the circumferential direction C.

In certain instances, the interfaces 236 may all include same, or similar, geometries, sizes, and/or the like as compared to one another. In other instances, at least two of the interfaces 236 can have different geometries, sizes, and/or the like as compared to one another. For example, interfaces 236A and 236B are depicted as having different attributes as compared to one another. These different attributes may define different operational flexibilities at each of the interfaces 236. That is, some interfaces 236 may permit radial displacement between the outer tab 216 of the nozzle 200 and the outer portion 222 of the frame assembly 218 while prohibiting circumferential displacement. Other interfaces 236 may permit displacement between the outer tab 216 and outer portion 222 of the frame assembly 218 in all directions. Moreover, the variable displacement in each direction may be the same or different. In such a manner, operational flexibility between the nozzle 200 and frame assembly 218 can be controlled.

Figure 4:
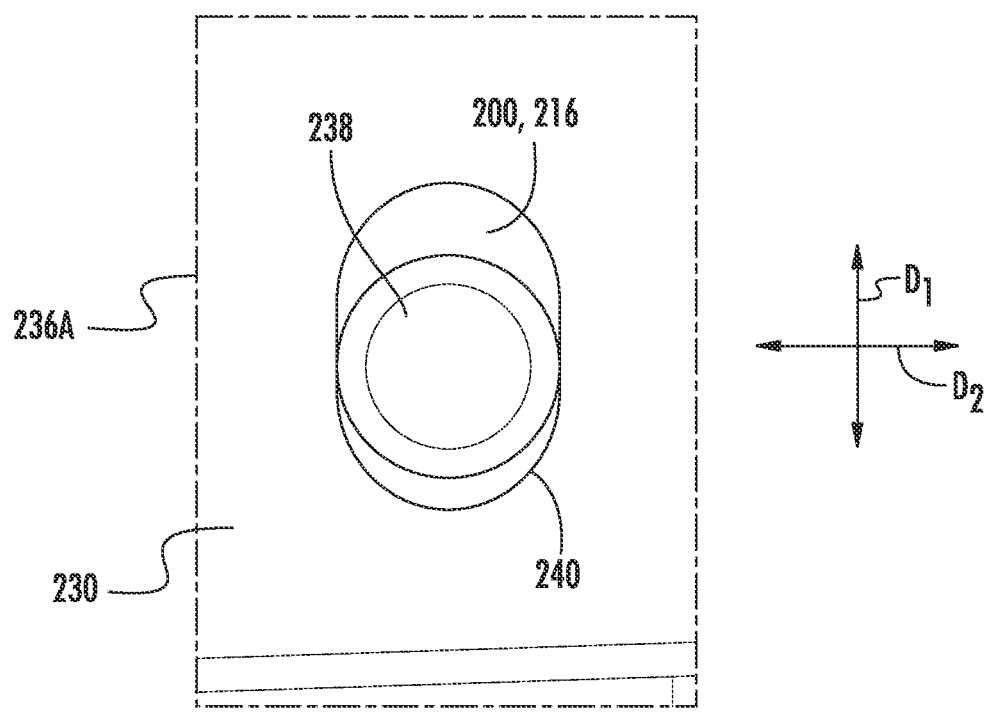
FIG. 4 is an enlarged plan view of an interface between a nozzle and a frame assembly of a gas turbine engine in accordance with an exemplary embodiment as seen in Box B in FIG. 2.
Figure 5:
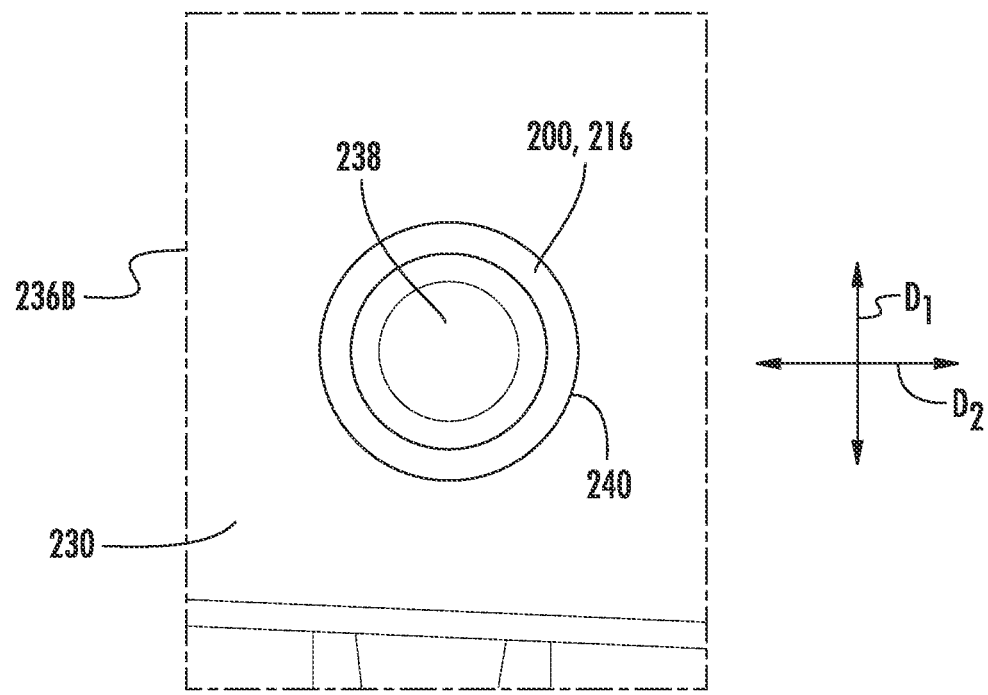
FIG. 5 is an enlarged plan view of an interface between a nozzle and a frame assembly of a gas turbine engine in accordance with an exemplary embodiment as seen in Box C in FIG. 2.

FIG. 4 illustrates an enlarged plan view of the interface 236A between the nozzle 200 and the frame assembly 218 in accordance with an exemplary embodiment as seen in Box B in FIG. 2. FIG. 5 illustrates an enlarged plan view of the interface 236B between the nozzle 200 and the frame assembly 218 in accordance with an exemplary embodiment as seen in Box C in FIG. 2. The interfaces 236A and 236B depicted in FIGS. 4 and 5 are oversized interfaces configured to permit relative movement between the outer end 206 of the nozzle 200 and the frame assembly 218. The oversized interfaces 236A and 236B are configured to permit relative movement between the nozzle 200 and the frame assembly 218 and may allow for easier installation of the nozzle 200 relative to the frame assembly 218. In an embodiment, the interfaces 236A and 236B define a first maximum relative displacement in a first direction, $D_1$, and a second maximum relative displacement in a second direction, $D_2$, different from the first direction, $D_1$. In an embodiment, the first and second maximum relative displacements are different from one another. For instance, the first maximum relative displacement in the first direction $D_1$ can be at least 1.01 times the second maximum relative displacement in the second direction $D_2$, such as at least 1.02 times the second maximum relative displacement in the second direction $D_2$, such as at least 1.03 times the second maximum relative displacement in the second direction $D_2$, such as at least 1.04 times the second maximum relative displacement in the second direction $D_2$, such as at least 1.05 times the second maximum relative displacement in the second direction $D_2$, such as at least 1.1 times the second maximum relative displacement in the second direction $D_2$, such as at least 1.25 times the second maximum relative displacement in the second direction $D_2$, such as at least 1.5 times the second maximum relative displacement in the second direction $D_2$, such as at least 2 times the second maximum relative displacement in the second direction $D_2$. For the interface 236A depicted in FIG. 4, the second maximum relative displacement is generally equal to zero and the second direction, $D_2$, generally corresponds with a radial direction of the engine 10. In such a manner, the interface 236A has tolerance in the radial direction while preventing relative movement in the circumferential direction. For the interface 236B depicted in FIG. 5, the first and second maximum relative displacements can be generally equal to one another. That is, the interface 236B can exhibit generally uniform tolerance in more than one direction.

In an embodiment, the interfaces 236A and 236B can include a portion of the nozzle 200, such as a pin 238, and a portion of the frame assembly 218, such as a recess or hole 240 through which the pin 238 can be coupled to the frame assembly 218. The pin 238 can move within the hole 240 so as to create tolerance between the nozzle 200 and the frame assembly 218.

In a non-illustrated embodiment, at least one of the interfaces 236 can be a non-oversized, i.e., tight-tolerance, interface. In such a manner, tolerance between the outer end 206 of the nozzle 200 and the frame assembly 218 can be controlled.

Referring again to FIG. 3, in certain embodiments, the engine 10 can further include a honeycomb feature 242. The honeycomb feature 242 can be disposed downstream of the nozzle 200 such that airflow passes through the stator vanes 208 prior to being in fluid communication with the honeycomb feature 242. The honeycomb feature 242 can be configured to reduce flowpath capacity and flowpath ingestion, particularly upstream of the honeycomb feature 242. In the illustrated embodiment, the honeycomb feature 242 includes portions disposed on each of the nozzle 200 and the frame assembly 218. These portions act in concert to provide benefits of the honeycomb structure 242. In another embodiment, the honeycomb structure 242 can be disposed on either one of the nozzle 200 or frame assembly 218 and not the other one of the nozzle 200 or frame assembly 218.

In certain instances, the engine 10 can further include a sealing assembly disposed between the nozzle 200 and another component of the engine 10 so as to fluidly isolate a volume therebetween. In the embodiment illustrated in FIG. 3, the sealing assembly includes a first sealing element 244A disposed between the outer end 206 of the nozzle 200 and an outer end 246 of another turbine component, e.g., a high-speed turbine upstream of the nozzle 200. The sealing assembly further includes a second sealing element 244B disposed between the inner end 204 of the nozzle 200 and an inner end 248 of another turbine component, e.g., the same high-speed turbine upstream of the nozzle 200. The sealing assembly can further include a plurality of other sealing elements configured to fluidly isolate volumes of the engine 10.

Further aspects of the invention are provided by the subject matter of the following clauses:

Embodiment 1. A gas turbine engine comprising: a frame assembly; a turbine assembly; and a nozzle disposed in the turbine assembly, wherein the nozzle defines an inner end along a radial direction and an outer end along the radial direction, wherein the outer end of the nozzle is supported by the frame assembly, wherein the inner end of the nozzle is supported by the frame assembly, and wherein the inner end of the nozzle is displaceable relative to the frame assembly in at least the radial direction.

Embodiment 2. The gas turbine engine of any one or more of the embodiments, wherein the inner end of the nozzle is coupled to an axial retention feature of the frame assembly, and wherein an interface between the inner end of the nozzle and the axial retention feature is a dynamic interface.

Embodiment 3. The gas turbine engine of any one or more of the embodiments, wherein the axial retention feature comprises a groove defining an effective depth, as measured from an open end to an effective bottom-out position, and wherein the groove is configured to accommodate a maximum displacement of the nozzle in the radial direction.

Embodiment 4. The gas turbine engine of any one or more of the embodiments, wherein the outer end of the nozzle is coupled to the frame assembly at a plurality of interfaces spaced apart from one another around a circumference of the gas turbine engine Embodiment 5. The gas turbine engine of any one or more of the embodiments, wherein at least one of the interfaces is oversized to permit relative movement between the outer end of the nozzle and the frame assembly.

Embodiment 6. The gas turbine engine of any one or more of the embodiments, wherein the oversized interface is configured to permit a first maximum relative displacement in a first direction and a second maximum relative displacement in a second direction different from the first direction, and wherein the first and second maximum relative displacements are different from one another.

Embodiment 7. The gas turbine engine of any one or more of the embodiments, wherein the first direction is in a generally radial direction, wherein the second direction is in a generally axial direction, and wherein the first maximum relative displacement is greater than the second maximum relative displacement.

Embodiment 8. The gas turbine engine of any one or more of the embodiments, wherein the plurality of interfaces comprises a first set of interfaces having a first attribute and a second set of interfaces having a second attribute different than the first attribute.

Embodiment 9. The gas turbine engine of any one or more of the embodiments, wherein the turbine assembly comprises a high pressure turbine and a low pressure turbine, and wherein the nozzle is disposed between the high pressure turbine and the low pressure turbine.

Embodiment 10. The gas turbine engine of any one or more of the embodiments, wherein the outer end of the nozzle is coupled to the frame assembly through a secondary component, the secondary component extending radially inward from the frame assembly toward a central axis of the gas turbine engine.

Embodiment 11. The gas turbine engine of any one or more of the embodiments, wherein the gas turbine engine further comprises a honeycomb feature disposed downstream of the nozzle and configured to reduce flowpath capacity and flowpath ingestion.

Embodiment 12. The gas turbine engine of any one or more of the embodiments, wherein the gas turbine engine further comprises a sealing assembly disposed between the inner end of the nozzle and a portion of the turbine assembly.

Embodiment 13. The gas turbine engine of any one or more of the embodiments, wherein, in use, at least 20% of an axial force incurred along the nozzle is supported by the frame assembly through the inner end of the nozzle.

Embodiment 14. The gas turbine engine of any one or more of the embodiments, wherein the nozzle comprises a ceramic matrix composite.

Embodiment 15. A nozzle assembly for a gas turbine engine, the nozzle assembly comprising: an annular body defining an inner end in a radial direction and an outer end in the radial direction, wherein the inner end of the annular body is configured to be engaged with an inner portion of a frame assembly of the gas turbine engine, wherein the outer end of the annular body is configured to be engaged with an outer portion of the frame assembly of the gas turbine engine, and wherein the inner end of the annular body is configured to form a dynamic interface with the inner portion of the frame assembly.

Embodiment 16. The nozzle assembly of any one or more of the embodiments, wherein the nozzle assembly is configured to be disposed within a turbine assembly of a gas turbine engine.

Embodiment 17. The nozzle assembly of any one or more of the embodiments, wherein the outer end of the annular body includes a plurality of interfaces spaced apart from one another around a circumference, each interface of the plurality of interfaces being configured to be coupled with the outer portion of the frame assembly.

Embodiment 18. The nozzle assembly of any one or more of the embodiments, wherein the interfaces define a plurality of oversized interfaces configured to permit a first maximum relative displacement in a first direction and a second maximum relative displacement in a second direction different from the first direction, and wherein the first and second maximum relative displacements are different from one another.

Embodiment 19. The nozzle assembly of any one or more of the embodiments, wherein the first maximum relative displacement is in a radial direction, and wherein the first maximum relative displacement is greater than the second maximum relative displacement.

Embodiment 20. The nozzle assembly of any one or more of the embodiments, wherein the annular body further comprises an inner tab extending from the inner end of the annular body in a radial direction, and wherein the inner tab is configured to be received at an axial retention feature of the frame assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A gas turbine engine comprising:
a frame assembly;
a turbine assembly; and
a nozzle disposed in the turbine assembly, wherein the nozzle defines an inner end along a radial direction and an outer end along the radial direction, wherein the outer end of the nozzle is supported by the frame assembly, wherein the inner end of the nozzle is supported by the frame assembly, and wherein the inner end of the nozzle is displaceable relative to the frame assembly in at least the radial direction; and
wherein the outer end of the nozzle is coupled to the frame assembly at a plurality of interfaces spaced apart from one another around a circumference of the gas turbine engine, wherein the plurality of interfaces includes a first interface and a second interface, wherein the first interface defines a first geometry, and wherein the second interface defines a second geometry different than the first geometry;
wherein the first interface comprises a first pin and defines a first slot, wherein the second interface comprises a second pin and defines a second slot, wherein the second slot defines a different geometry than the first slot.

2. The gas turbine engine of claim 1, wherein the inner end of the nozzle is coupled to an axial retention feature of the frame assembly, and wherein an interface between the inner end of the nozzle and the axial retention feature is a dynamic interface.

3. The gas turbine engine of claim 1, wherein at least one of the interfaces is oversized such that at least one of the first slot of the first interface or the second slot of the second interface is larger than the first pin or second pin, respectively, to permit relative movement between the outer end of the nozzle and the frame assembly.

4. The gas turbine engine of claim 3, wherein the first oversized interface is configured to permit a first maximum relative displacement in a first direction and the second oversized interface is configured to permit a second maximum relative displacement in a second direction different from the first direction.

5. The gas turbine engine of claim 4, wherein the first direction is in a generally radial direction, wherein the second direction is in a generally axial direction, and wherein the first maximum relative displacement is greater than the second maximum relative displacement.

6. The gas turbine engine of claim 1, wherein the plurality of interfaces comprises a first set of interfaces having a first attribute and a second set of interfaces having a second attribute different than the first attribute.

7. The gas turbine engine of claim 1, wherein the turbine assembly comprises a high pressure turbine and a low pressure turbine, and wherein the nozzle is disposed between the high pressure turbine and the low pressure turbine.

8. The gas turbine engine of claim 1, wherein the outer end of the nozzle is coupled to the frame assembly through a secondary component, the secondary component extending radially inward from the frame assembly toward a central axis of the gas turbine engine.

9. The gas turbine engine of claim 1, wherein the gas turbine engine further comprises a honeycomb feature disposed downstream of the nozzle and configured to reduce flowpath capacity and flowpath ingestion.

10. The gas turbine engine of claim 1, wherein the gas turbine engine further comprises a sealing assembly disposed between the inner end of the nozzle and a portion of the turbine assembly.

11. The gas turbine engine of claim 1, wherein, in use, at least 20% of an axial force incurred along the nozzle is supported by the frame assembly through the inner end of the nozzle.

12. The gas turbine engine of claim 1, wherein the nozzle comprises a ceramic matrix composite.

13. A nozzle assembly for a gas turbine engine, the nozzle assembly comprising:
an annular body defining an inner end in a radial direction and an outer end in the radial direction, wherein the inner end of the annular body is configured to be engaged with an inner portion of a frame assembly of the gas turbine engine, wherein the outer end of the annular body is configured to be engaged with an outer portion of the frame assembly of the gas turbine engine, and wherein the inner end of the annular body is configured to form a dynamic interface with the inner portion of the frame assembly, wherein the outer end of the annular body includes a plurality of interfaces spaced apart from one another around a circumference, each interface of the plurality of interfaces being configured to be coupled with the outer portion of the frame assembly, wherein the plurality of interface includes a first interface and a second interface, wherein the first interface defines a first geometry, and wherein the second interface defines a second geometry different than the first geometry;
wherein the first interface comprises a first pin and defines a first slot, wherein the second interface comprises a second pin and defines a second slot, wherein the second slot defines a different geometry than the first slot.

14. The nozzle assembly of claim 13, wherein the nozzle assembly is configured to be disposed within a turbine assembly of a gas turbine engine.

15. The nozzle assembly of claim 13, wherein the first and second interfaces define a plurality of oversized interfaces such that the first slot of the first interface is larger than the first pin and the second slot of the second interface is larger than the second pin, wherein the first oversized interface is configured to permit a first maximum relative displacement in a first direction and the second oversized interface is configured to permit a second maximum relative displacement in a second direction different from the first direction.

16. The nozzle assembly of claim 15, wherein the first maximum relative displacement is in a radial direction, and wherein the first maximum relative displacement is greater than the second maximum relative displacement.

17. The nozzle assembly of claim 13, wherein the annular body further comprises an inner tab extending from the inner end of the annular body in a radial direction, and wherein the inner tab is configured to be received at an axial retention feature of the frame assembly.

\* \* \* \* \*